United States Patent
Xu et al.

(10) Patent No.: US 12,369,188 B2
(45) Date of Patent: Jul. 22, 2025

(54) TECHNIQUES FOR UE-TO-UE CHANNEL OCCUPANCY TIME SHARING IN UNLICENSED SPECTRUM

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US); Yisheng Xue, San Diego, CA (US); Chih-Hao Liu, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 17/759,951

(22) PCT Filed: Apr. 15, 2020

(86) PCT No.: PCT/CN2020/084849
§ 371 (c)(1),
(2) Date: Aug. 2, 2022

(87) PCT Pub. No.: WO2021/207957
PCT Pub. Date: Oct. 21, 2021

(65) Prior Publication Data
US 2023/0066174 A1    Mar. 2, 2023

(51) Int. Cl.
*H04W 74/0808* (2024.01)
(52) U.S. Cl.
CPC .............................. *H04W 74/0808* (2013.01)
(58) Field of Classification Search
CPC . H04W 74/0808; H04W 92/18; H04W 24/08; H04W 52/52; H04W 72/0446; H04L 27/26025
See application file for complete search history.

(56) References Cited

U.S. PATENT DOCUMENTS

| 10,959,223 B2 | 3/2021 | Baghel et al. |
| 2016/0073366 A1 | 3/2016 | Ng et al. |
| (Continued) | | |

FOREIGN PATENT DOCUMENTS

| CN | 110475343 A | 11/2019 |
| CN | 110784874 A | 2/2020 |
| (Continued) | | |

OTHER PUBLICATIONS

CATT: "Physical Layer Structure for NR Sidelink", 3GPP TSG RAN WG1 Meeting #99, R1-1912153, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019, 22 Pages, XP051823234.
Huawei et al., "Sidelink Resource Allocation Mode 2 for NR V2X", 3GPP TSG RAN WGI Meeting #97, R1-1906011, Reno, USA, May 13, 2019-May 17, 2019, pp. 1-15, May 3, 2019.
Supplementary European Search Report—EP20930954—Search Authority—The Hague—Nov. 3, 2023.
(Continued)

*Primary Examiner* — Yu-Wen Chang
(74) *Attorney, Agent, or Firm* — Dalei Dong; Harrity & Harrity, LLP

(57) ABSTRACT

Various aspects of the present disclosure generally relate to wireless communication. In some aspects, a first user equipment (UE) may determine, within a channel occupancy time shared with a second UE, one or more contention slot starting times based at least in part on a listen before talk duration and an automatic gain control duration. The first UE may transmit a sidelink communication to the second UE at a starting time selected from one or more of the one or more contention slot starting times. Numerous other aspects are provided.

35 Claims, 14 Drawing Sheets

(56) References Cited

U.S. PATENT DOCUMENTS

| | | | |
|---|---|---|---|
| 2019/0306923 A1 | 10/2019 | Xiong et al. | |
| 2020/0022181 A1 | 1/2020 | Li et al. | |
| 2020/0029318 A1* | 1/2020 | Guo | H04W 74/0833 |
| 2021/0105815 A1* | 4/2021 | Salem | H04W 72/21 |
| 2022/0086860 A1 | 3/2022 | Panteleev | H04W 72/20 |
| 2023/0015587 A1* | 1/2023 | Zhao | H04W 74/0816 |
| 2023/0246790 A1* | 8/2023 | Liu | H04L 5/0051 370/336 |
| 2024/0073947 A1* | 2/2024 | Babaei | H04W 74/0808 |

FOREIGN PATENT DOCUMENTS

| | | |
|---|---|---|
| CN | 110831179 A | 2/2020 |
| WO | 2018217397 | 11/2018 |
| WO | WO-2019138658 A1 | 7/2019 |
| WO | WO-2020023475 A1 | 1/2020 |

OTHER PUBLICATIONS

International Search Report and Written Opinion—PCT/CN2020/084849—ISA/EPO—Jan. 15, 2021.

Qualcomm Incorporated: "TxOP Frame Structure for NR Unlicensed," 3GPP Draft, 3GPP TSG RAN WG1 Meeting #94, R1-1809476, 7.2.2.2 Frame Structure for NR-U Operation, 3rd Generation Partnership Project (3GPP), Mobile Competence Centre, 650, Route Des Lucioles, F-06921, Sophia-Antipolis Cedex, France, vol. RAN WG1. No. Gothenburg, Sweden, Aug. 20, 2018-Aug. 24, 2018, Aug. 17, 2018 (Aug. 17, 2018), XP051516838, 11 pages, Retrieved from the Internet: URL: http://www.3gpp.org/ftp/tsg%5Fran/WG1%5FRL1/TSGR1%5F94/Docs/R1%2D1809476%2Ezip [retrieved on Aug. 17, 2018], p. 3-p. 4, figures 1, 2, the whole document.

Spreadtrum Communications: "Discussion on DL Signals and Channels for NR-U", 3GPP TSG RAN WG1 #99, R1-1912561, Nov. 22, 2019 (Nov. 22, 2019), 5 pages, section 2.1, 2.2.

* cited by examiner

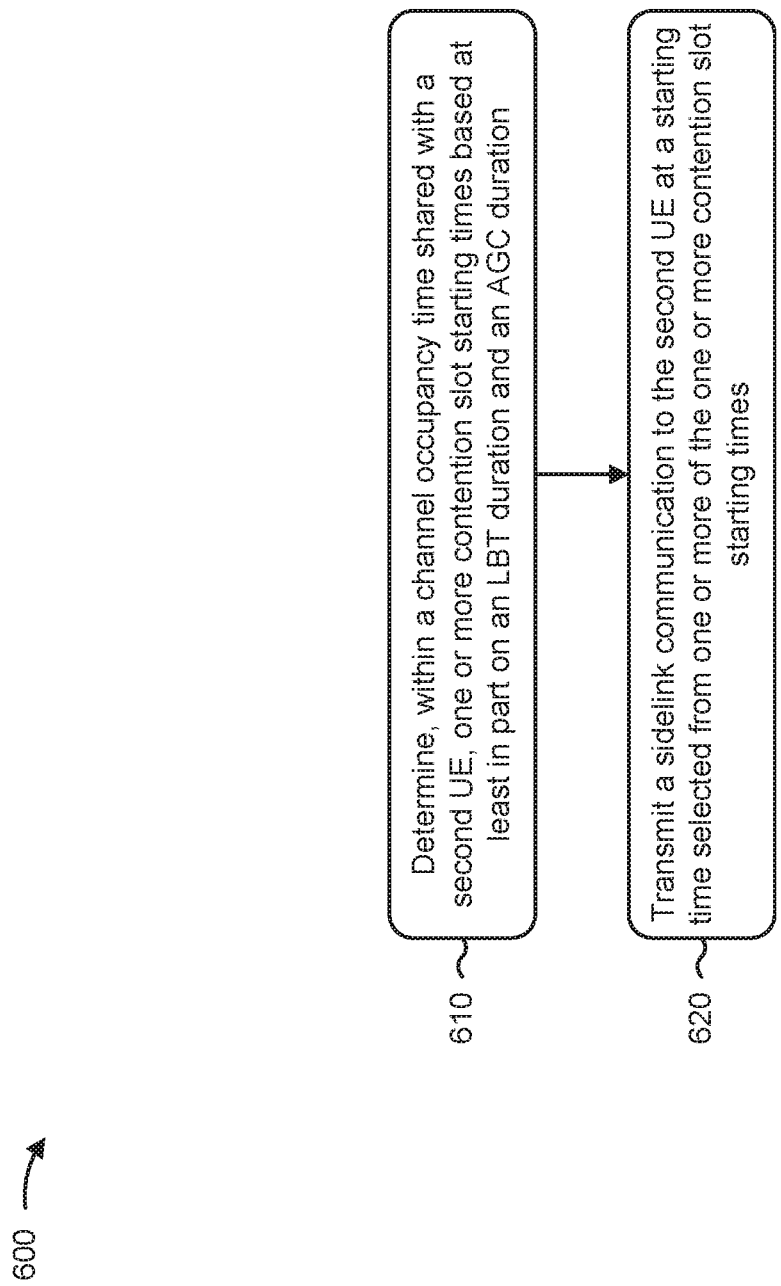

TECHNIQUES FOR UE-TO-UE CHANNEL OCCUPANCY TIME SHARING IN UNLICENSED SPECTRUM

CROSS-REFERENCE TO RELATED APPLICATION

This application is a 371 national stage of Patent Cooperation Treaty (PCT) Application No. PCT/CN2020/084849 filed on Apr. 15, 2020, entitled "TECHNIQUES FOR UE-TO-UE CHANNEL OCCUPANCY TIME SHARING IN UNLICENSED SPECTRUM," which is hereby expressly incorporated by reference herein.

FIELD OF THE DISCLOSURE

Aspects of the present disclosure generally relate to wireless communication and to techniques and apparatuses for user equipment (UE)-to-UE channel occupancy time sharing in unlicensed spectrum.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a first user equipment (UE), may include: determining, within a channel occupancy time shared with a second UE, one or more contention slot starting times based at least in part on a listen before talk (LBT) duration and an automatic gain control (AGC) duration; and transmitting a sidelink communication to the second UE at a starting time selected from one or more of the one or more contention slot starting times.

In some aspects, a first UE for wireless communication may include a memory and one or more processors operatively coupled to the memory. The memory and the one or more processors may be configured to: determine, within a channel occupancy time shared with a second UE, one or more contention slot starting times based at least in part on an LBT duration and an AGC duration; and transmit a sidelink communication to the second UE at a starting time selected from one or more of the one or more contention slot starting times.

In some aspects, a non-transitory computer-readable medium may store one or more instructions for wireless communication. The one or more instructions, when executed by one or more processors of a first UE, may cause the one or more processors to: determine, within a channel occupancy time shared with a second UE, one or more contention slot starting times based at least in part on an LBT duration and an AGC duration; and transmit a sidelink communication to the second UE at a starting time selected from one or more of the one or more contention slot starting times.

In some aspects, an apparatus for wireless communication may include: means for determining, within a channel occupancy time shared with a UE, one or more contention slot starting times based at least in part on an LBT duration and an AGC duration; and means for transmitting a sidelink communication to the UE at a starting time selected from one or more of the one or more contention slot starting times.

In some aspects, the one or more contention slot starting times occur in one or more of a last symbol in a current slot or a first symbol in a next slot.

In some aspects, the LBT duration starts from a beginning of a last symbol in a current slot, and the AGC duration includes at least a portion of a first symbol in the next slot.

In some aspects, the one or more contention slot starting times occur in a window between an ending time of the LBT duration and a starting time of the AGC duration.

In some aspects, the portion of the first symbol in the next slot that corresponds to the AGC duration is based at least in part on a subcarrier spacing.

In some aspects, a quantity of the one or more contention slot starting times is based at least in part on a contention slot duration.

In some aspects, a quantity of the one or more contention slot starting times is based at least in part on a subcarrier spacing.

In some aspects, the LBT duration has a length that depends on a location of a first symbol in which the sidelink communication is transmitted.

In some aspects, the one or more contention slot starting times are identified relative to an ending time of the LBT duration.

In some aspects, the one or more contention slot starting times are identified relative to a starting time of the AGC duration.

In some aspects, the starting time for transmitting the sidelink communication is randomly selected from the one or more of the one or more contention slot starting times.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process performed, for example, by a UE, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
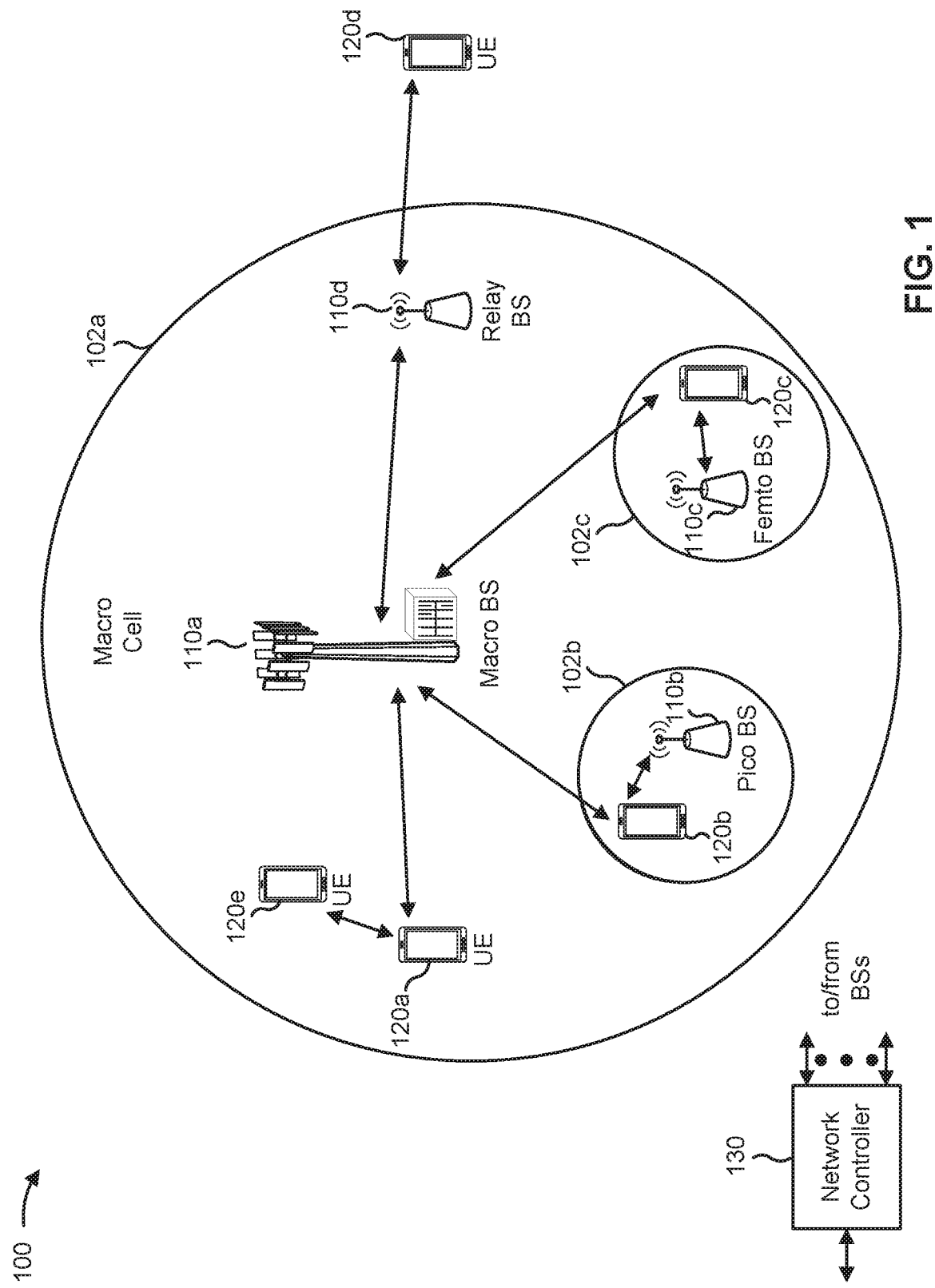
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, a vehicle-to-pedestrian (V2P) protocol, a vehicle-to-network (V2N) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
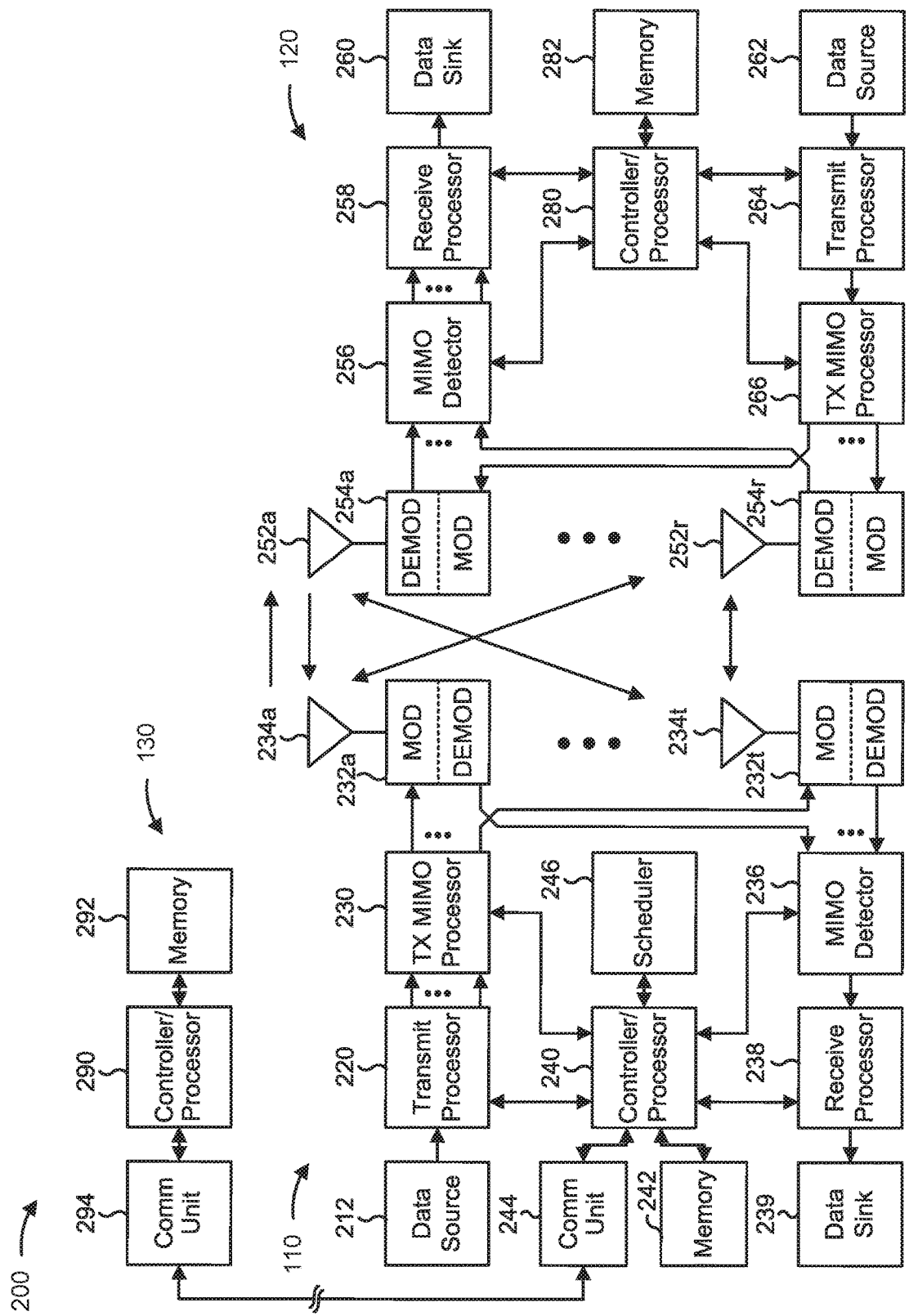
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with UE-to-UE channel occupancy time sharing in unlicensed spectrum, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6 and/or other processes as described herein. A scheduler 246 may schedule UEs for data transmission on the downlink and/or uplink.

In some aspects, UE 120 may include means for determining, within a channel occupancy time shared with another UE 120, one or more contention slot starting times based at least in part on a listen before talk (LBT) duration and an automatic gain control (AGC) duration, means for transmitting a sidelink communication to the other UE 120 at a starting time selected from one or more of the one or more contention slot starting times, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
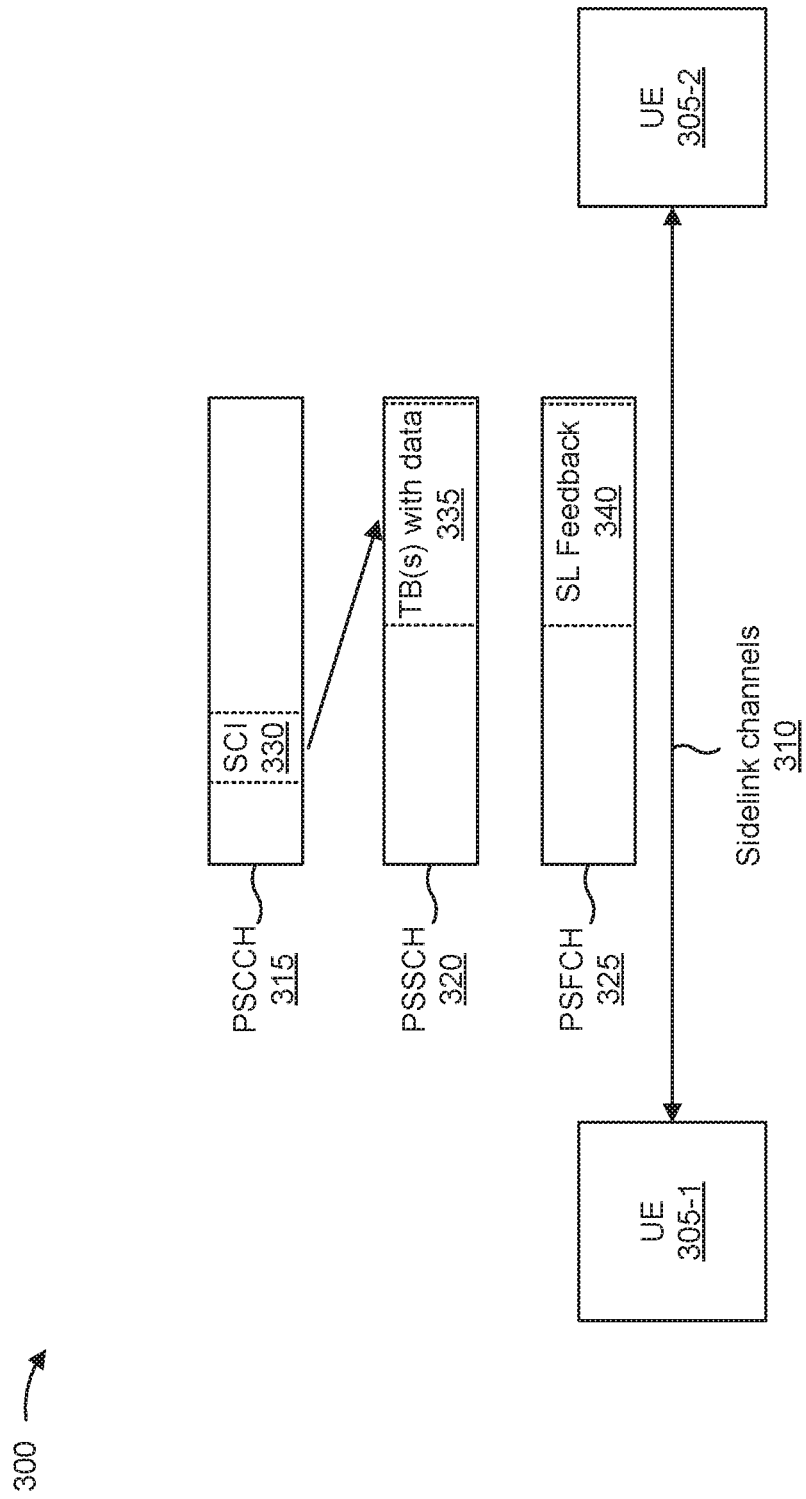
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, V2N communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). For example, in a first mode, sometimes referred to as mode 1 and/or the like, a base station (e.g., base station 110) may allocate resources for the one or more sidelink channels 310, may provide a dynamic grant or activate a configured sidelink grant for sidelink communications, may receive sidelink feedback reported by a transmitting UE, and/or the like. Additionally, or alternatively, in a second mode, sometimes referred to as mode 2 and/or the like, UEs 305-1 and 305-2 may autonomously select sidelink resources for the one or more sidelink channels 310, and sidelink communications may be scheduled using sidelink control information (SCI). Additionally, or alternatively, in some cases, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, a physical sidelink feedback channel (PSFCH) 325, and/or the like. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry SCI 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4A:
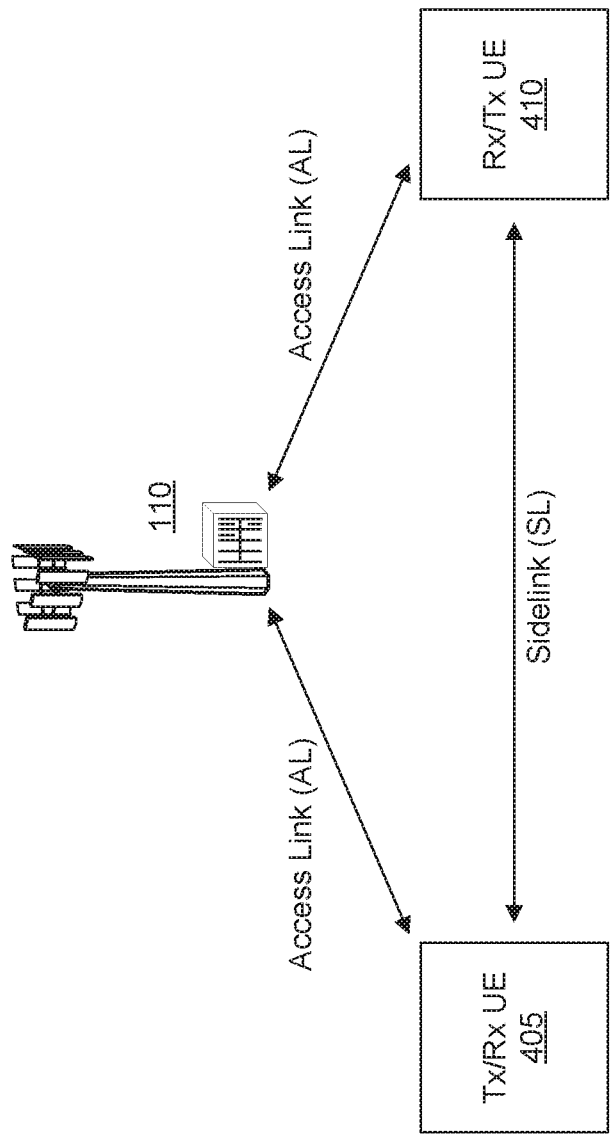
FIG. 4A is a diagram illustrating an example of sidelink communications and access link communications, in accordance with various aspects of the present disclosure.

FIG. 4A is a diagram illustrating an example 400 of sidelink communications and access link communications, in accordance with various aspects of the present disclosure.

As shown in FIG. 4A, a transmitter (Tx) UE 405 and a receiver (Rx) UE 410 may communicate with one another via a sidelink, as described above in connection with FIG. 3. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. Thus, as described herein, a sidelink may refer to a direct link between UEs 120, and an access link may refer to a direct link between a base station 110 and a UE 120. Sidelink communications may be transmitted via the sidelink, and access link communications may be transmitted via the access link. An access link communication may be either a downlink communication (from a base station 110 to a UE 120) or an uplink communication (from a UE 120 to a base station 110). Furthermore, in some aspects, sidelink communications may be transmitted via the sidelink and/or access link communications may be transmitted via the access link in a licensed radio frequency (RF) spectrum, an unlicensed RF spectrum, and/or any suitable combination thereof For example, to accommodate increasing traffic demands, there have been various efforts to improve spectral efficiency in wireless networks and thereby increase network capacity (e.g., via use of higher order modulations, advanced MIMO antenna technologies, multi-cell coordination techniques, and/or the like). Another way to potentially improve network capacity is to expand system bandwidth. However, available spectrum in lower frequency bands that have traditionally been licensed or otherwise allocated to mobile network operators has become very scarce. Accordingly, various technologies have been developed to enable operation of a cellular radio access technology (RAT) in unlicensed or other shared spectrum. For example, Licensed-Assisted Access (LAA) uses carrier aggregation on a downlink to combine LTE in a licensed frequency band with LTE in an unlicensed frequency band (e.g., the 2.4 and/or 5 GHz bands already populated by wireless local area network (WLAN) or "Wi-Fi" devices). In other examples, Enhanced LAA (eLAA) and Further Enhanced LAA (feLAA) technologies enable both uplink and downlink LTE operation in unlicensed spectrum, MulteFire is an LTE-based technology that operates in unlicensed and shared spectrum in a stand-alone mode, NR-U enables NR operation in unlicensed spectrum, and/or the like. In general, when operating a cellular RAT in unlicensed spectrum (e.g., using LAA, eLAA, feLAA, MulteFire, NR-U, and/or the like), one challenge that arises is the need to ensure fair coexistence with incumbent (e.g., WLAN) systems that may be operating in the unlicensed spectrum.

For example, prior to gaining access to and/or transmitting over an unlicensed channel, a transmitting device (e.g., base station 110, UE 405, UE 410, and/or the like) may need to perform a listen-before-talk (LBT) procedure to contend for access to the unlicensed channel. The LBT procedure may generally include a clear channel assessment (CCA) procedure that is performed in order to determine whether the unlicensed channel is available (e.g., unoccupied by other transmitters). In particular, the CCA procedure may include detecting an energy level on the unlicensed channel and determining whether the energy level satisfies (e.g., is less than or equal to) a threshold, sometimes referred to as an energy detection threshold and/or the like. When the energy level satisfies (e.g., does not equal or exceed) the threshold, the CCA procedure is deemed to be successful and the transmitting device may gain access to the unlicensed channel for a duration that may be referred to as a channel occupancy time (COT) during which the transmitting device can perform transmissions without performing additional LBT operations. When the energy level does not satisfy the threshold, the CCA procedure is unsuccessful and contention to access the unlicensed channel may be deemed unsuccessful.

When the CCA procedure results in a determination that the unlicensed channel band is unavailable (e.g., because the energy level detected on the unlicensed channel indicates that another device is already using the channel), the CCA procedure may be performed again at a later time. In environments in which the transmitting device may be starved of access to an unlicensed channel (e.g., due to WLAN activity or transmissions by other devices), an extended CCA (eCCA) procedure may be employed to increase the likelihood that the transmitting device will successfully obtain access to the unlicensed channel. For example, a transmitting device performing an eCCA procedure may perform a random quantity of CCA procedures (from 1 to q), in accordance with an eCCA counter. If and/or when the transmitting device senses that the channel has become clear, the transmitting device may start a random wait period based on the eCCA counter and start to transmit if the channel remains clear over the random wait period.

Accordingly, although a wireless network can be configured to use unlicensed spectrum to achieve faster data rates, provide a more responsive user experience, offload traffic from a licensed spectrum, and/or the like, the need to ensure fair coexistence with incumbent systems (e.g., WLAN devices) may hamper efficient usage of the unlicensed spectrum. For example, even when there is no interference, the LBT procedure used to ensure that no other devices are already using the channel introduces a delay before transmissions can start, which may degrade user experience, result in unacceptable performance for latency-sensitive or delay-sensitive applications, and/or the like. Furthermore, these problems may be exacerbated when the initial CCA procedure is unsuccessful, as the transmitting device can transmit on the channel only after performing an additional quantity of CCA procedures and determining that the channel has become clear and remained clear for a random wait period. Furthermore, in some cases, the channel occupancy time obtained by a transmitting device may have a duration that is longer than necessary for the transmitting device to perform the desired transmissions, which may lead to inefficient usage of the unlicensed channel.

Accordingly, in some cases, a wireless network may enable a channel occupancy time obtained by a transmitting device to be shared with other nodes in order to improve access, efficiency, and/or the like for an unlicensed channel. For example, in downlink-to-uplink channel occupancy time sharing over an access link, a base station 110 may acquire a channel occupancy time with an eCCA, and the channel occupancy time may be shared with one or more UEs (e.g., UE 405, UE 410, and/or the like) that can then transmit uplink signals within the channel occupancy time acquired by the base station 110. In this case, a UE attempting to initiate an uplink transmission within the channel occupancy time shared with the base station 110 can perform an uplink transmission without having to perform an LBT procedure, or the UE may perform the uplink transmission after performing a single-shot CCA with a shorter LBT procedure (e.g., a category 2 LBT procedure when the downlink-to-uplink gap duration is between 16 and 25 µs, a category 1 LBT procedure when a downlink-to-uplink gap duration is less than or equal to 16 µs, and/or the like). Additionally, or alternatively, a wireless network may support uplink-to-downlink channel occupancy time sharing over an access link. In this case, a UE-initiated channel occupancy time (e.g., for a configured grant PUSCH or a scheduled uplink transmission) can be shared with the base station 110. In this way, the base station 110 may be allowed to transmit control and/or broadcast signals and/or channels for any UE served by the base station 110, provided that the transmission contains a downlink signal, channel, and/or other transmission (e.g., a PDSCH, PDCCH, reference signal, and/or the like) intended to be received by the UE that initiated the channel occupancy.

Figure 4B:
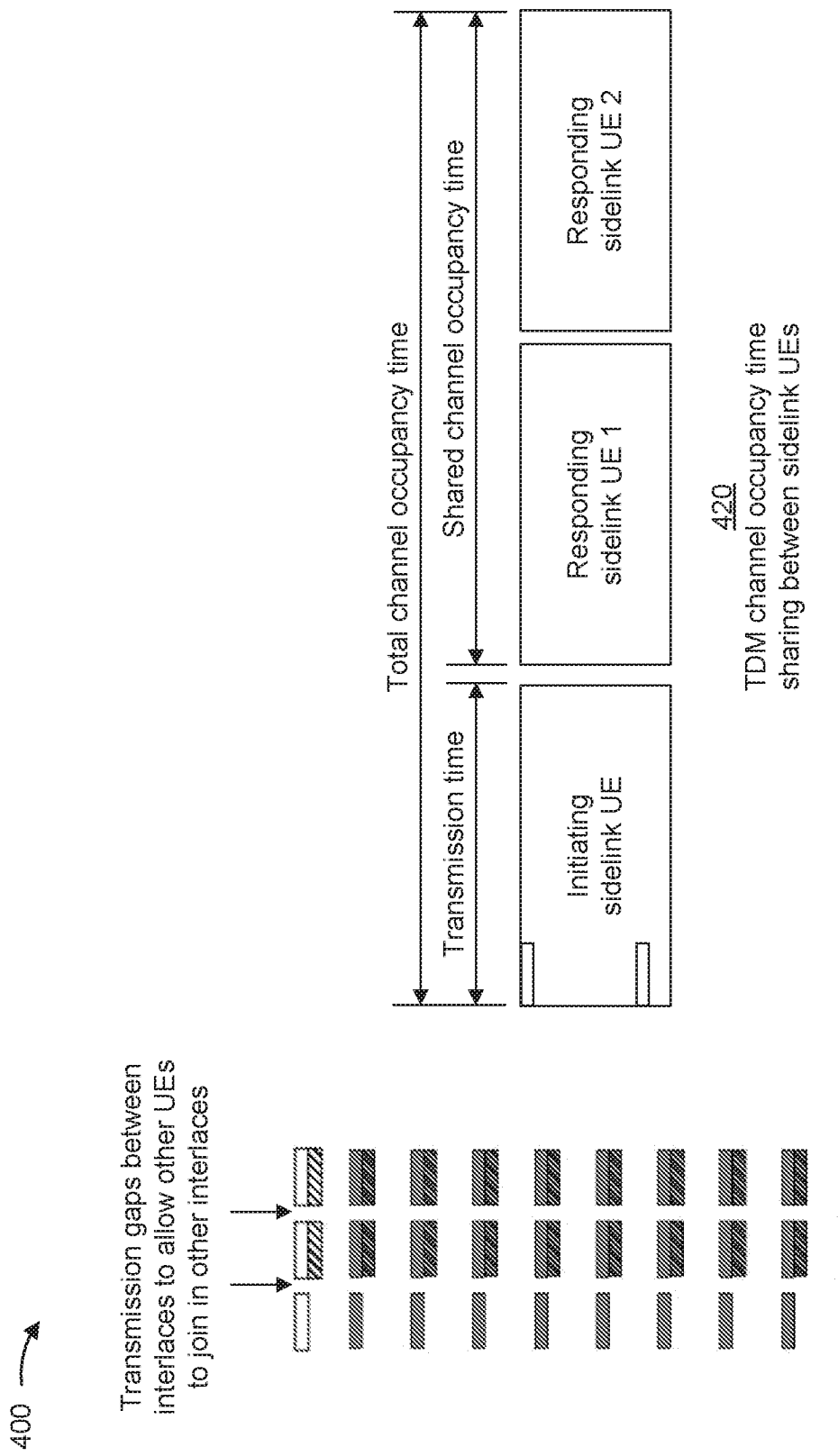
FIG. 4B is a diagram illustrating an example of channel occupancy time sharing between sidelink UEs, in accordance with various aspects of the present disclosure.

Additionally, or alternatively, a wireless network may support UE-to-UE channel occupancy time sharing over a sidelink. For example, as shown in FIG. 4B, and by reference number 415, a channel occupancy time acquired by an initiating UE (e.g., UE 405 and/or the like) may be shared in a frequency division multiplexing (FDM) mode by dividing the channel occupancy time into multiple interlaces (e.g., time periods during which one or more UEs may perform transmit operations). For example, as shown in FIG. 4B, the initiating UE may use one or more sidelink resources (e.g., time and frequency resources) to transmit in a first interlace after the channel occupancy time has been acquired, and a responding UE (e.g., UE 410 and/or the like) may use sidelink frequency resources that are non-overlapping with sidelink frequency resources used by the initiating UE to perform transmit operations in subsequent interlaces. Accordingly, as shown in FIG. 4B, FDM or interlace-based channel occupancy time sharing may introduce short transmission gaps between interlaces to allow other UEs to perform transmit operations in subsequent interlaces during a shared channel occupancy time, and sidelink control information transmitted by the initiating UE may carry information to support the interlace-based channel occupancy time sharing.

Additionally, or alternatively, as shown by reference number 420, UE-to-UE channel occupancy time sharing may be enabled in a time division multiplexing (TDM) mode. In this case, the total channel occupancy time may be divided into an initial time period during which the initiating UE may perform transmissions, which may include one or more sidelink control information transmissions that indicate when the initial transmission will end, a remaining duration of the channel occupancy time that is available for sharing, and/or the like. Accordingly, one or more responding UEs may monitor the sidelink control information transmitted by other UEs (e.g., the initiating UE) to recover channel occupancy time sharing information that can be used to perform transmissions during a time period that corresponds to a shared channel occupancy time.

Accordingly, as described above, UE-to-UE channel occupancy time sharing may enable better access to unlicensed spectrum, more efficient usage of unlicensed spectrum, and/or the like by enabling multiple UEs to perform transmissions during a channel occupancy time that is obtained by an initiating UE (e.g., a UE that successfully performed an LBT procedure to acquire access to an unlicensed channel). However, in some cases, implementing UE-to-UE channel occupancy time sharing may be challenging because sidelink communications generally have a rigid slot structure that provides limited opportunities (e.g., contention slots) in which another UE may perform an LBT procedure prior to transmitting. Some aspects described herein relate to techniques and apparatuses to enable UE-to-UE channel occupancy time sharing in unlicensed spectrum by defining, within a channel occupancy time shared by an initiating UE, one or more contention slot starting times that are based at least in part on an LBT duration and an automatic gain control (AGC) duration. In this way, a responding UE attempting to initiate a sidelink transmission during a channel occupancy time shared by an initiating UE may select an appropriate contention slot that leaves sufficient time to perform an LBT operation during the LBT duration to ensure that the unlicensed channel is available prior to transmitting. Furthermore, because sidelink signal characteristics can vary depending on the UEs that are engaged in sidelink communications in a given area at a given time, the AGC duration may ensure that the responding UE performing the transmission during the shared channel occupancy time and the initiating UE that may be receiving the transmission can perform AGC training to tune or otherwise configure an RF front end and/or other receive components to match a received signal power, to prevent receive components from becoming saturated, to maintain a stable signal level at an output stage regardless of variations in the signal level at an input stage, and/or the like.

As indicated above, FIGS. 4A-4B are provided as one or more examples. Other examples may differ from what is described with respect to FIGS. 4A-4B.

Figure 5A:
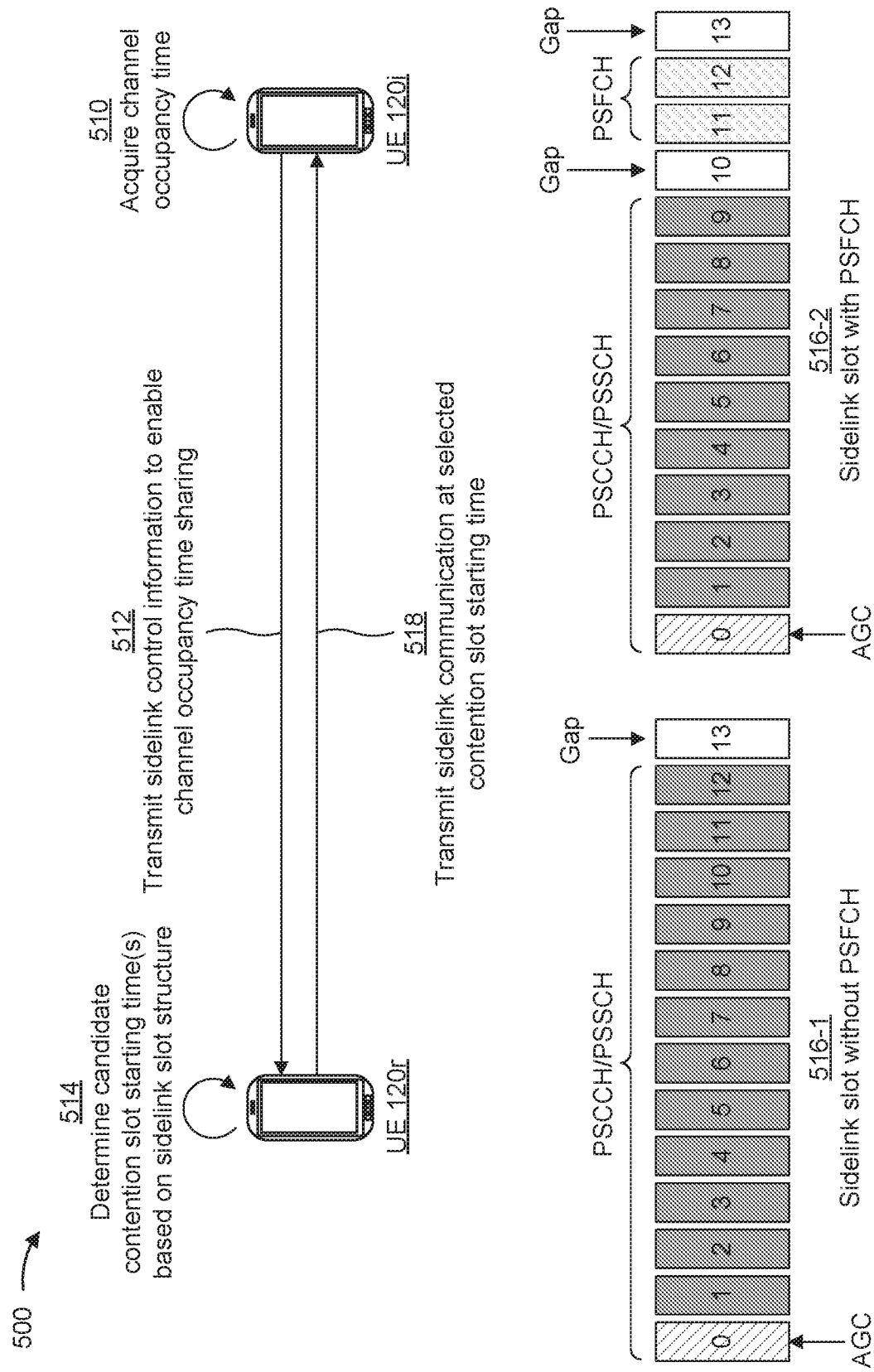
FIGS. 5A-5G are diagrams illustrating one or more examples of UE-to-UE channel occupancy time sharing in unlicensed spectrum, in accordance with various aspects of the present disclosure.

FIGS. 5A-5G are diagrams illustrating one or more examples 500 of UE-to-UE channel occupancy time sharing in unlicensed spectrum, in accordance with various aspects of the present disclosure. As shown in FIG. 5A, example(s) 500 include an initiating UE 120*i* that has acquired a channel occupancy time during which the UE 120*i* is permitted to transmit on an unlicensed channel, and a responding UE 120*r* communicating with the UE 120*i* on a sidelink via the unlicensed channel. Furthermore, as shown in FIGS. 5B-5G, the UE 120*r* may determine one or more contention slot starting times during which the UE 120*r* can transmit a sidelink communication in order to share the channel occupancy time acquired by the UE 120*i*.

As shown in FIG. 5A, and by reference number 510, the UE 120*i* may successfully perform an LBT procedure to acquire a channel occupancy time during which the UE 120*i* is permitted to transmit on an unlicensed channel. For example, prior to gaining access to, and transmitting over, the unlicensed channel, the UE 120*i* may perform the LBT procedure to contend for access to the unlicensed channel. In some aspects, the LBT procedure may include a clear channel assessment (CCA) procedure that the UE 120*i* performs to determine whether the unlicensed channel is available (e.g., unoccupied by other transmitters). In particular, the UE 120*i* may detect an energy level on the unlicensed channel, and the CCA procedure may be deemed successful if the energy level on the unlicensed channel satisfies (e.g., is less than or equal to) a threshold. In such cases, the UE 120*i* may gain access to the unlicensed channel to acquire the channel occupancy time during which the UE 120*i* can perform transmissions without performing additional LBT operations. Additionally, or alternatively, in cases where the energy level detected on the unlicensed channel fails to satisfy (e.g., is greater than or equal to the threshold), the UE 120*i* may perform the CCA procedure again and acquire the channel occupancy time at a later time. Additionally, or alternatively, the UE 120*i* may acquire the channel occupancy time by performing an extended CCA (eCCA) procedure and/or the like.

As further shown in FIG. 5A, and by reference number 512, the UE 120*i* may transmit, and the UE 120*r* may receive, sidelink control information to enable sharing of the channel occupancy time acquired by the UE 120*i*. For example, in some aspects, the sidelink control information may carry information to enable interlace-based sharing of the channel occupancy time in an FDM mode, information that indicates when a transmission by the UE 120*i* will end and/or a remaining length of the channel occupancy time that is available to be shared in a TDM mode, and/or the like.

As further shown in FIG. 5A, and by reference number 514, the UE 120*r* may determine one or more candidate contention slot starting times in which the UE 120*r* may attempt to perform an LBT procedure based at least in part on a sidelink slot structure used for sidelink communications between the UEs 120*i*, 120*r*. For example, as shown by reference number 516-1, a sidelink slot structure without a physical sidelink feedback channel (PSFCH) may include fourteen (14) symbols total, with thirteen (13) symbols indexed from zero (0) to twelve (12) available for physical sidelink control channel (PSCCH) and/or physical sidelink shared channel (PSSCH) transmissions and a final symbol (index thirteen (13)) in the slot left as a gap during which no transmissions are performed. Furthermore, as shown in FIG. 5A, the first symbol is used for AGC training, whereby the second symbol (symbol 1) is a repetition of the first symbol (symbol 0) to increase reliability for the PSCCH and/or PSSCH transmission (e.g., because the receiving UE may be unable to properly receive and/or decode the first symbol prior to performing AGC training). Alternatively, as shown by reference number 516-2, a sidelink slot structure with a PSFCH may include fourteen (14) symbols total, with ten (10) symbols indexed from zero (0) to nine (9) available for PSCCH and/or PSSCH transmissions, two symbols indexed eleven (11) and twelve (12) used for repetitions of a PSFCH symbol, and two symbols indexed ten (10) and thirteen (13) left as gaps during which no transmissions are performed.

Accordingly, in some aspects, the UE 120*r* may determine the one or more candidate contention slot starting times, which may represent possible times when the UE 120*r* can start a transmission in the channel occupancy time shared by the UE 120*i*, within a joint period that includes the last symbol (symbol 13) in a current slot (e.g., a slot prior to the transmission) and the first symbol (symbol 0) in a next slot (e.g., a slot in which the UE 120*r* is to perform the transmission). For example, regardless of whether the sidelink slot structure includes PSFCH symbols, the last symbol in a slot is a gap symbol and the first symbol in a slot is a repetition of the second symbol. Accordingly, the last symbol in a current slot and a first symbol in a next slot may provide a joint mechanism of two symbols during which the one or more candidate contention slot starting times can be determined. In some aspects, the two-symbol period may include an initial period, $T_{minGap}$, that corresponds to an LBT duration in which the UE 120*r* may perform an LBT procedure prior to transmitting. For example, in some aspects, the LBT duration may be a 16 µs period or a 25 µs period depending on a location of a first symbol in which the UE 120r is to transmit. For example, the LBT duration may be 25 μs in cases where the UE 120i sharing the channel occupancy time has not performed a transmission in order to allow the full 25 μs LBT duration, or the LBT duration may be 16 μs in cases where the UE 120r is attempting to transmit in the first slot after the UE 120i has finished transmitting.

Furthermore, in some aspects, the two-symbol period may include an AGC period, $T_{AGC}$, that may be reserved for AGC training between the UE 120r and another UE (e.g., UE 120i) that is intended to be a recipient of a sidelink transmission from the UE 120r. For example, as described above, AGC training is generally used to enable a receiving UE to tune or otherwise configure an RF front end and/or other receive components to match a received signal power, to prevent receive components from becoming saturated, to maintain a stable signal level at an output stage regardless of variations in the signal level at an input stage, and/or the like. Accordingly, the AGC period, $T_{AGC}$, may correspond to a half-symbol (e.g., the second half of symbol 0). Alternatively, in the case of a 15 kHz subcarrier spacing, which generally has a longer symbol duration than a 30 kHz or 60 kHz subcarrier spacing, the AGC period, $T_{AGC}$, may include a full symbol (e.g., all of symbol 0) to enable better AGC performance.

Accordingly, in some aspects, the candidate contention slot starting times may be determined in a duration, T, between the ending time of the LBT duration, $T_{minGap}$, and the starting time of, the AGC duration, $T_{AGC}$, as follows:

$$T=2*T_{symbol}-T_{minGap}-T_{AGC}$$

where $T_{symbol}$ is a duration of one symbol, which may vary depending on subcarrier spacing. For example, $T_{symbol}$ may be approximately 66.7 μs for a 15 kHz subcarrier spacing, 33.4 μs for a 30 kHz subcarrier spacing, 16.7 μs for a 60 kHz subcarrier spacing, and/or the like. Accordingly, given an approximately 9 μs duration for a contention slot in which to attempt an LBT procedure, a quantity, K, of possible candidate contention slot starting times may be determined as follows:

$$K=\lfloor(T-T_{LBT}+T_{minGap})/9 \text{ us}\rfloor+1$$

Accordingly, because the duration, T, depends on the duration of one symbol, the quantity, K, of possible candidate contention slot starting times may similarly depend on the duration of one symbol, as described in further below with reference to FIGS. 5B-5G. Furthermore, in some aspects, the candidate contention slot starting times may be defined relative to an ending point of the LBT duration, $T_{minGap}$, or relative to the starting time of the AGC duration, $T_{AGC}$. For example, in some aspects, the ending time of the LBT duration may be denoted as to, and the K candidate contention slot starting times may be determined as $t_0+9*k$ for k=0, . . . , K−1. Alternatively, in cases where the candidate contention slot starting times are defined relative to the starting time of, the AGC duration, $T_{AGC}$, the starting time of the AGC duration may be denoted as to, and the K candidate contention slot starting times may be determined as $t_0-9*k$ for k=0, . . . , K−1. In either case, as shown by reference number 418, the UE 120r may randomly select one of the candidate contention slot starting times and transmit a sidelink communication to UE 120i within the channel occupancy time shared by the UE 120i.

Figure 5B:
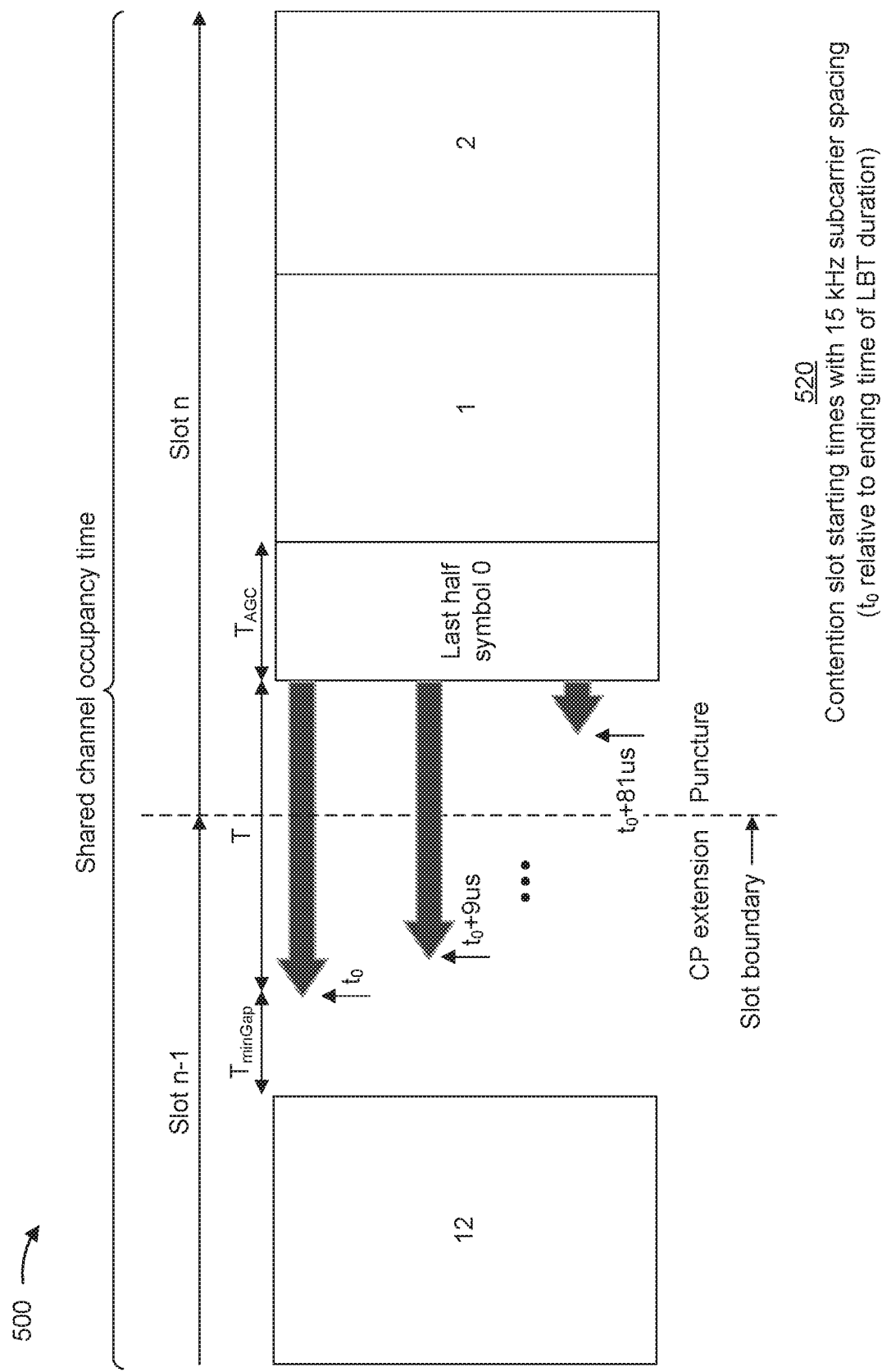
Figure 5C:
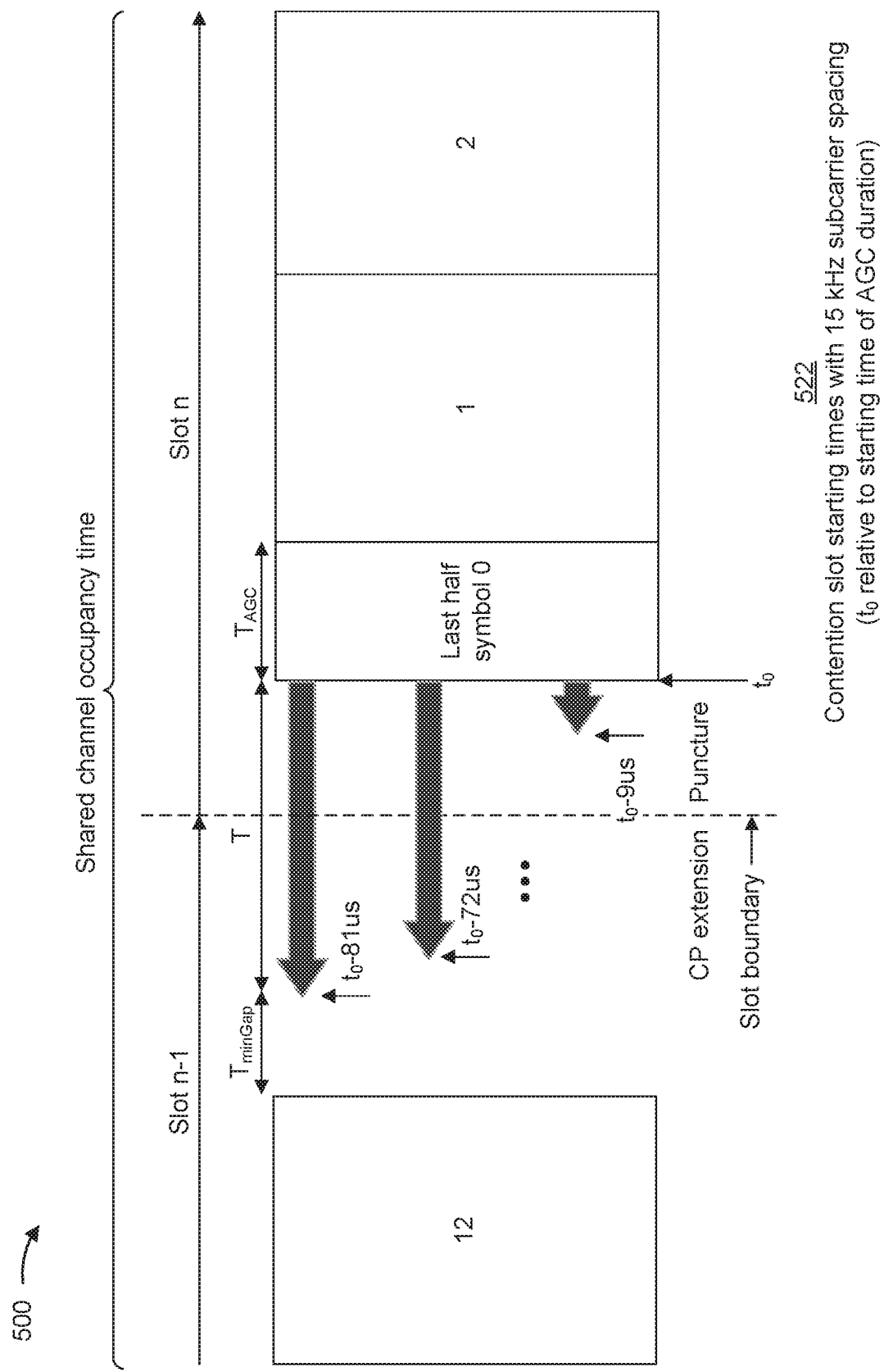

For example, as shown in FIG. 5B, and by reference number 520, the UE 120r may randomly select a set of candidate contention slot starting times for a 15 kHz subcarrier spacing, with to defined relative to the ending time of the LBT duration. In this case, at a 15 kHz subcarrier spacing with a 66.7 μs symbol duration, a total span of the two-symbol period that encompasses the gap symbol (symbol 13) and the repetition symbol used for AGC training (symbol 0) is 133.4 μs. Accordingly, assuming that the LBT duration $T_{minGap}$ is 25 μs and the last half-symbol of symbol 0 is reserved for AGC training, the duration T in which the contention slot starting times may occur includes 1.5 symbols−$T_{minGap}$, which is approximately 75 μs. Given an approximately 9 μs duration for each contention slot, the time period T between the end of the LBT duration, $T_{minGap}$, and the start of the AGC duration, $T_{AGC}$, may include up to 10 candidate contention slot starting times at times $t_0+9*k$ for k=0, . . . , K−1 (e.g., $t_0$, $t_0+9$ μs, . . . , $t_0+81$ μs). Alternatively, as shown in FIG. 5C, and by reference number 522, the UE 120r may randomly select a set of candidate contention slot starting times for a 15 kHz subcarrier spacing, with to defined relative to the starting time of the AGC duration such that the candidate contention slot starting times are at times $t_0-9*k$ for k=0, . . . , K−1 (e.g., $t_0$, $t_0-9$ μs, . . . , $t_0-81$ μs). Furthermore, in cases where the UE 120r selects a candidate contention slot starting time prior to the slot boundary between slot n and slot n+1, a signal transmitted prior to the slot boundary may be considered a cyclic prefix extension of symbol 0 in slot n+1. Alternatively, in cases where the UE 120r selects a candidate contention slot starting time after the slot boundary between slot n and slot n+1, a gap after the slot boundary may be obtained by puncturing symbol 0 in slot n+1. In this case, because there are several candidate contention slot starting times available prior to the slot boundary, the AGC duration may be extended to a full symbol (e.g., all of symbol 0) to improve AGC performance. Furthermore, the time period T has one additional candidate contention slot starting time in cases where a shorter LBT duration of 16 μs is used. Accordingly, in some cases, the AGC duration may have a length that depends on UE functionality (e.g., how much time is needed to perform AGC training), the length of the LBT duration, and/or the like.

Figure 5D:
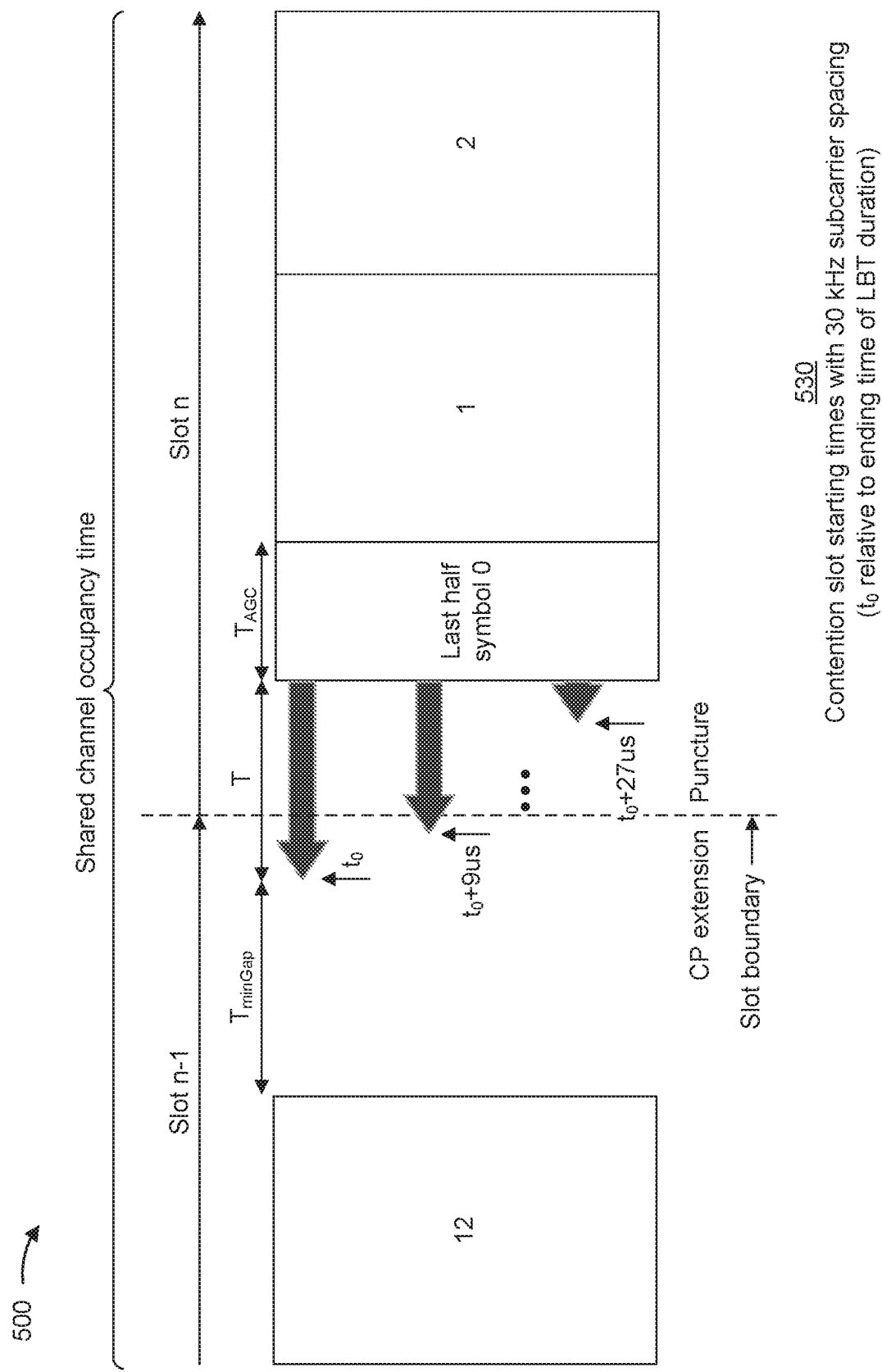
Figure 5E:
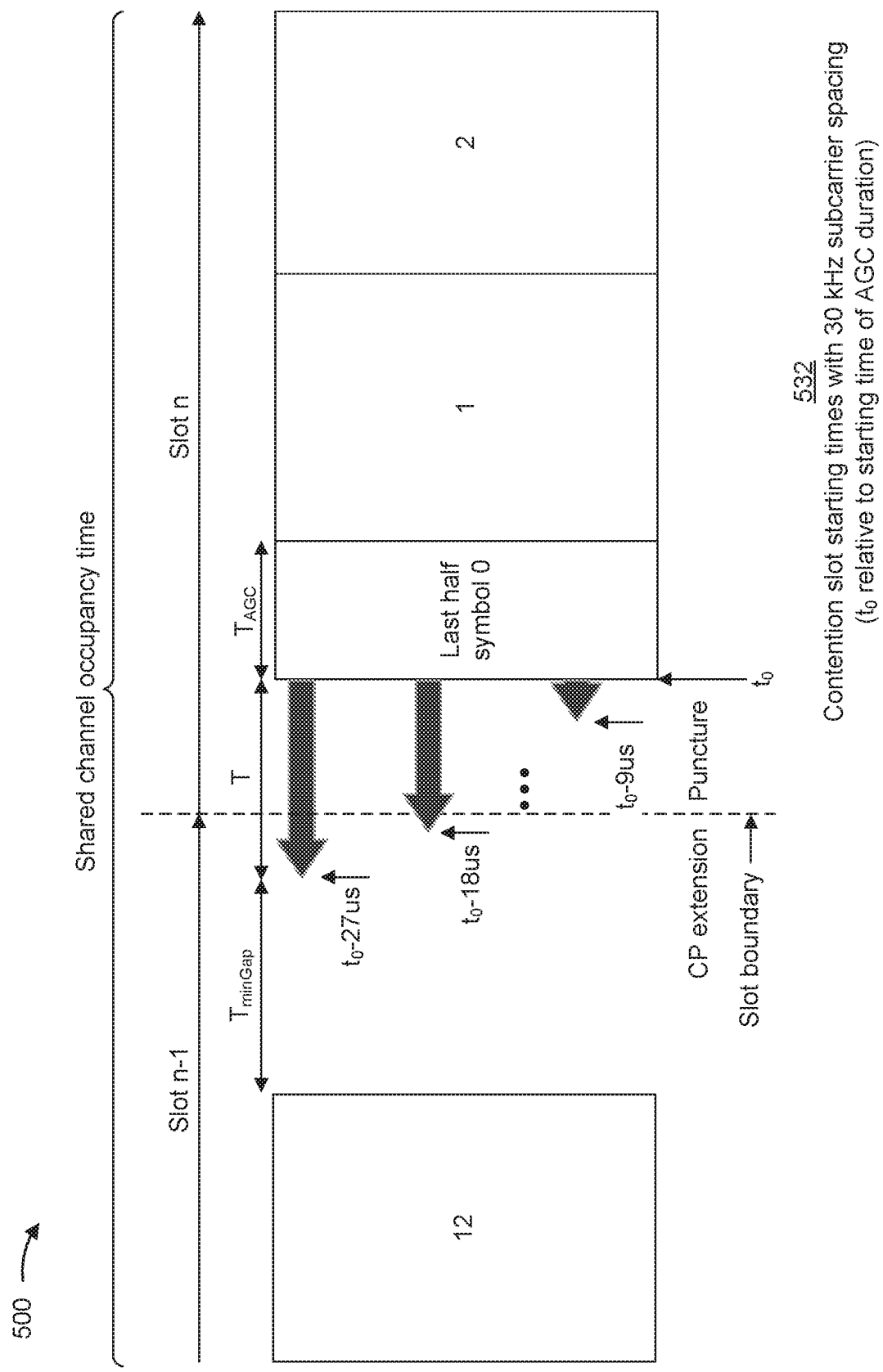

In another example, as shown in FIG. 5D, and by reference number 530, the UE 120r may randomly select a set of candidate contention slot starting times for a 30 kHz subcarrier spacing, with to defined relative to the ending time of the LBT duration. In this case, at a 30 kHz subcarrier spacing with a 33.4 μs symbol duration, a total span of the two-symbol period that encompasses the gap symbol (symbol 13) and the repetition symbol used for AGC training (symbol 0) is approximately 66.7 μs. Accordingly, assuming that the LBT duration $T_{minGap}$ is 25 μs and the last half-symbol of symbol 0 is reserved for AGC training, the duration T in which the contention slot starting times may occur includes 1.5 symbols−$T_{minGap}$, or approximately 41.7 μs. In this case, the time period T may include up to 4 candidate contention slot starting times at times $t_0+9*k$ for k=0, . . . , K−1 (e.g., $t_0$, $t_0+9$ μs, . . . , $t_o+27$ μs). Alternatively, as shown in FIG. 5E, and by reference number 532, to may be defined relative to the starting time of the AGC duration such that the candidate contention slot starting times are at times $t_0-9*k$ for k=0, . . . , K−1 (e.g., $t_0$, $t_0-9$ μs, . . . , $t_0-27$ μs). Furthermore, in cases where the UE 120r selects a candidate contention slot starting time prior to the slot boundary between slot n and slot n+1, a signal transmitted prior to the slot boundary may be considered a cyclic prefix extension of symbol 0 in slot n+1. Alternatively, in cases where the UE 120r selects a candidate contention slot starting time after the slot boundary between slot n and slot n+1, a gap after the slot boundary may be obtained by puncturing symbol 0 in slot n+1. In this case, because there are only two candidate contention slot starting times available prior to the slot boundary, the AGC duration may be restricted to a half-symbol to provide more candidate contention slot starting times. Furthermore, the time period T has one additional candidate contention slot starting time in cases where a shorter LBT duration of 16 μs is used.

Figure 5F:
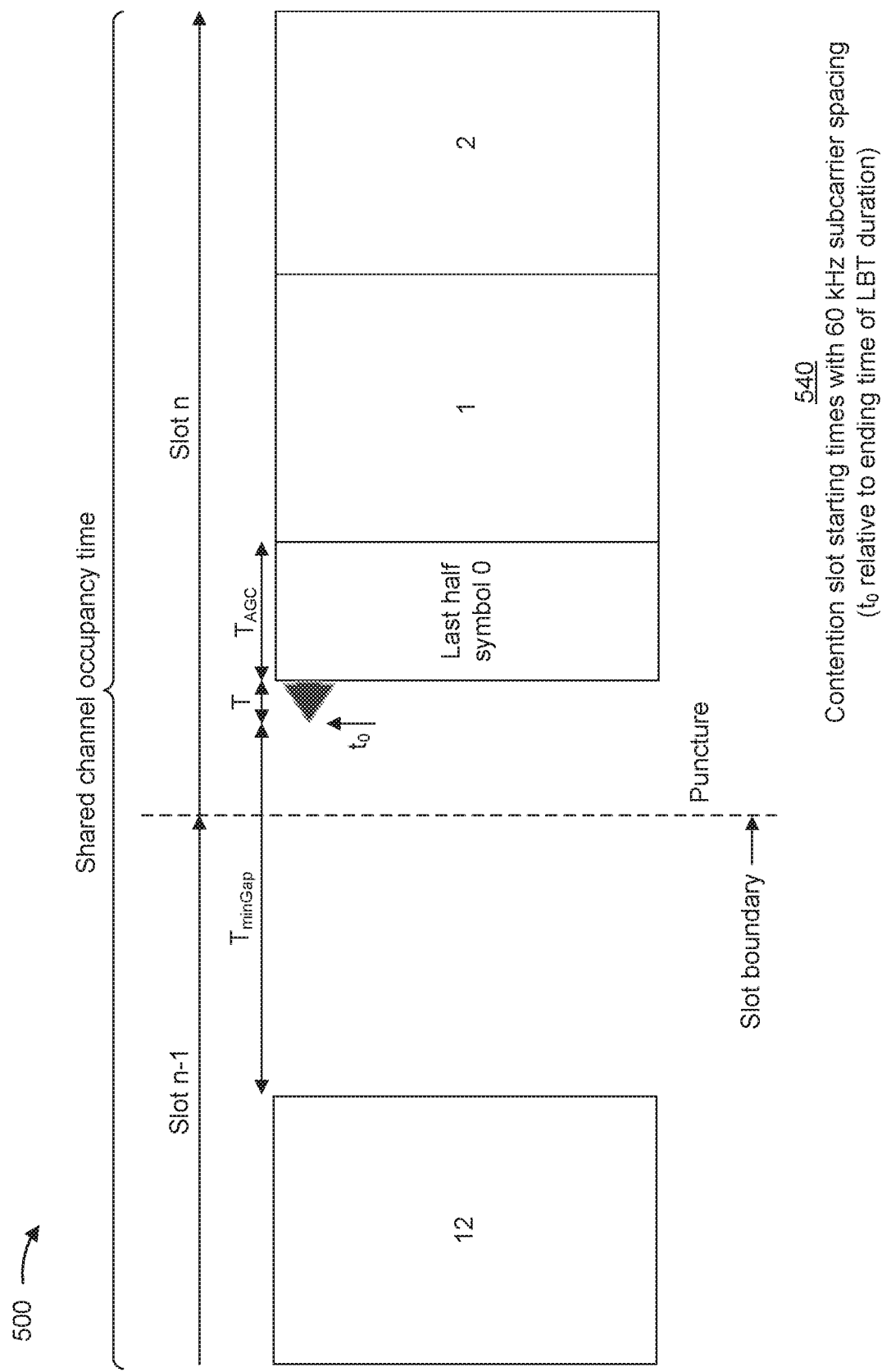
Figure 5G:
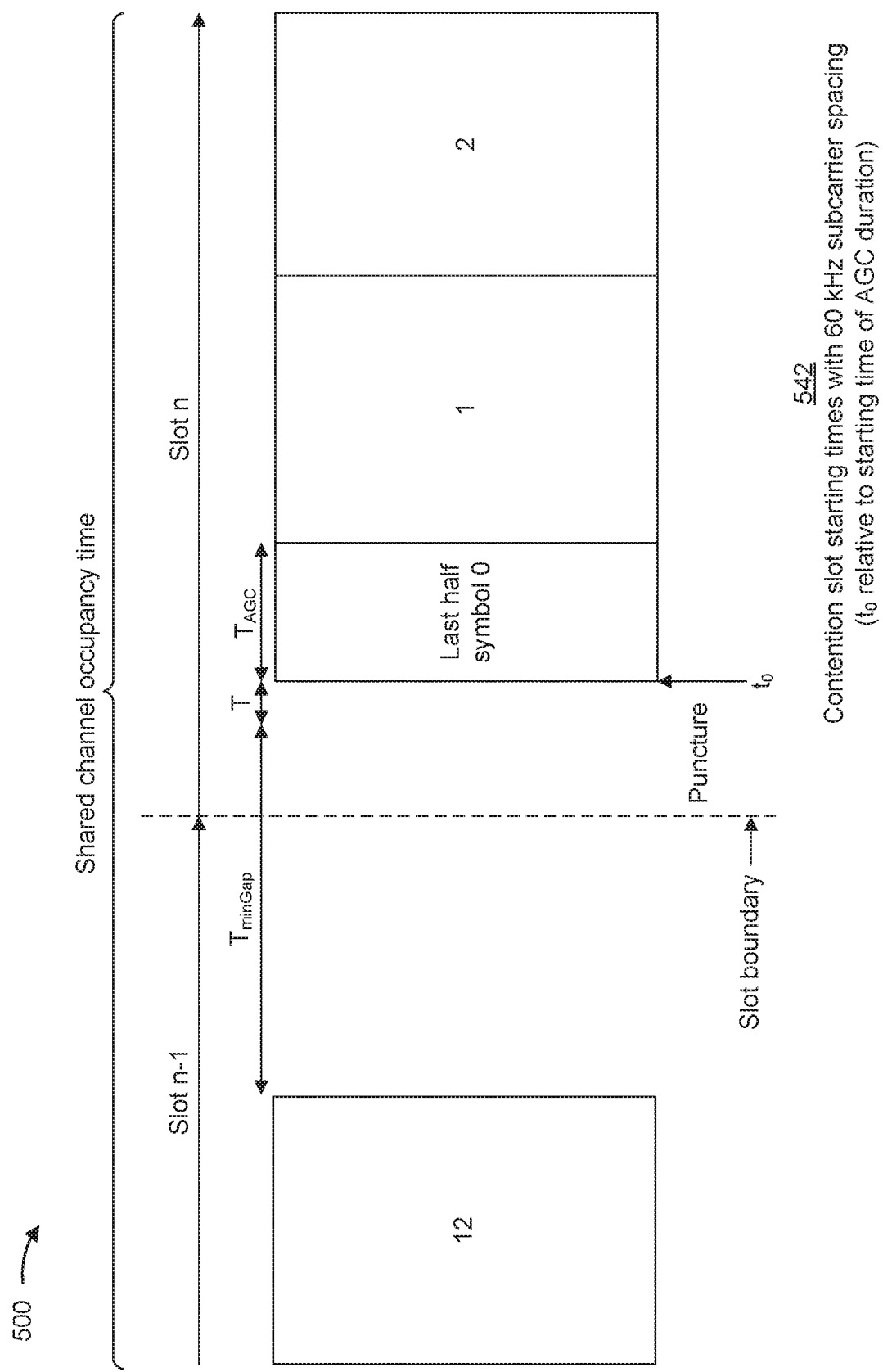

In another example, as shown in FIG. 5F, and by reference number 540, the UE 120r may randomly select a set of candidate contention slot starting times for a 60 kHz subcarrier spacing, with $t_0$ defined relative to the ending time of the LBT duration. In this case, at a 60 kHz subcarrier spacing with a 16.7 μs symbol duration, a total span of the two-symbol period that encompasses the gap symbol (symbol 13) and the repetition symbol used for AGC training (symbol 0) is approximately 33.4 μs. Accordingly, assuming that the LBT duration $T_{minGap}$ is 25 μs and the last half-symbol of symbol 0 is reserved for AGC training, the duration T in which the contention slot starting times may occur includes 1.5 symbols–$T_{minGap}$, or approximately 8.4 μs. In this case, the time period T may include only one (1) candidate contention slot starting time at time $t_0$. Alternatively, as shown in FIG. 5G, and by reference number 542, $t_0$ may be defined relative to the starting time of the AGC duration such that the candidate contention slot starting time occurs at time $t_0$ (e.g., at the starting time of the AGC duration). Furthermore, in this case, there may be no candidate contention slot starting time(s) prior to the slot boundary between slot n and slot n+1, whereby a gap after the slot boundary may be obtained by puncturing symbol 0 in slot n+1. In this case, because there are no candidate contention slot starting times available prior to the slot boundary, the AGC duration may be restricted to half-symbol to ensure that there is at least one candidate contention slot starting time available to select (although the time period T may have one additional candidate contention slot starting time in cases where a shorter LBT duration of 16 μs is used, as described above).

As indicated above, FIGS. 5A-5G are provided as one or more examples. Other examples may differ from what is described with respect to FIGS. 5A-5G.

FIG. 6 is a diagram illustrating an example process 600 performed, for example, by a first UE, in accordance with various aspects of the present disclosure. Example process 600 is an example where the first UE (e.g., UE 120, UE 305-1, UE 305-2, UE 405, UE 410, UE 120i, UE 120r, and/or the like) performs operations associated with UE-to-UE channel occupancy time sharing in unlicensed spectrum.

As shown in FIG. 6, in some aspects, process 600 may include determining, within a channel occupancy time shared with a second UE, one or more contention slot starting times based at least in part on an LBT duration and an AGC duration (block 610). For example, the first UE may determine (e.g., using controller/processor 280, memory 282, and/or the like), within a channel occupancy time shared with a second UE, one or more contention slot starting times based at least in part on an LBT duration and an AGC duration, as described above.

As further shown in FIG. 6, in some aspects, process 600 may include transmitting a sidelink communication to the second UE at a starting time selected from one or more of the one or more contention slot starting times (block 620). For example, the first UE may transmit (e.g., using controller/processor 280, transmit processor 264, TX MIMO processor 266, MOD 254, antenna 252, memory 282, and/or the like) a sidelink communication to the second UE at a starting time selected from one or more of the one or more contention slot starting times, as described above.

Process 600 may include additional aspects, such as any single aspect or any combination of aspects described below and/or in connection with one or more other processes described elsewhere herein.

In a first aspect, the one or more contention slot starting times occur in one or more of a last symbol in a current slot or a first symbol in a next slot.

In a second aspect, alone or in combination with the first aspect, the LBT duration starts from a beginning of a last symbol in a current slot and the AGC duration includes at least a portion of a first symbol in the next slot.

In a third aspect, alone or in combination with one or more of the first and second aspects, the one or more contention slot starting times occur in a window between an ending time of the LBT duration and a starting time of the AGC duration.

In a fourth aspect, alone or in combination with one or more of the first through third aspects, the portion of the first symbol in the next slot that corresponds to the AGC duration is based at least in part on a subcarrier spacing.

In a fifth aspect, alone or in combination with one or more of the first through fourth aspects, a quantity of the one or more contention slot starting times is based at least in part on a contention slot duration.

In a sixth aspect, alone or in combination with one or more of the first through fifth aspects, a quantity of the one or more contention slot starting times is based at least in part on a subcarrier spacing.

In a seventh aspect, alone or in combination with one or more of the first through sixth aspects, the LBT duration has a length that depends on a location of a first symbol in which the sidelink communication is transmitted.

In an eighth aspect, alone or in combination with one or more of the first through seventh aspects, the one or more contention slot starting times are identified relative to an ending time of the LBT duration.

In a ninth aspect, alone or in combination with one or more of the first through eighth aspects, the one or more contention slot starting times are identified relative to a starting time of the AGC duration.

In a tenth aspect, alone or in combination with one or more of the first through ninth aspects, the starting time for transmitting the sidelink communication is randomly selected from the one or more of the one or more contention slot starting times.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
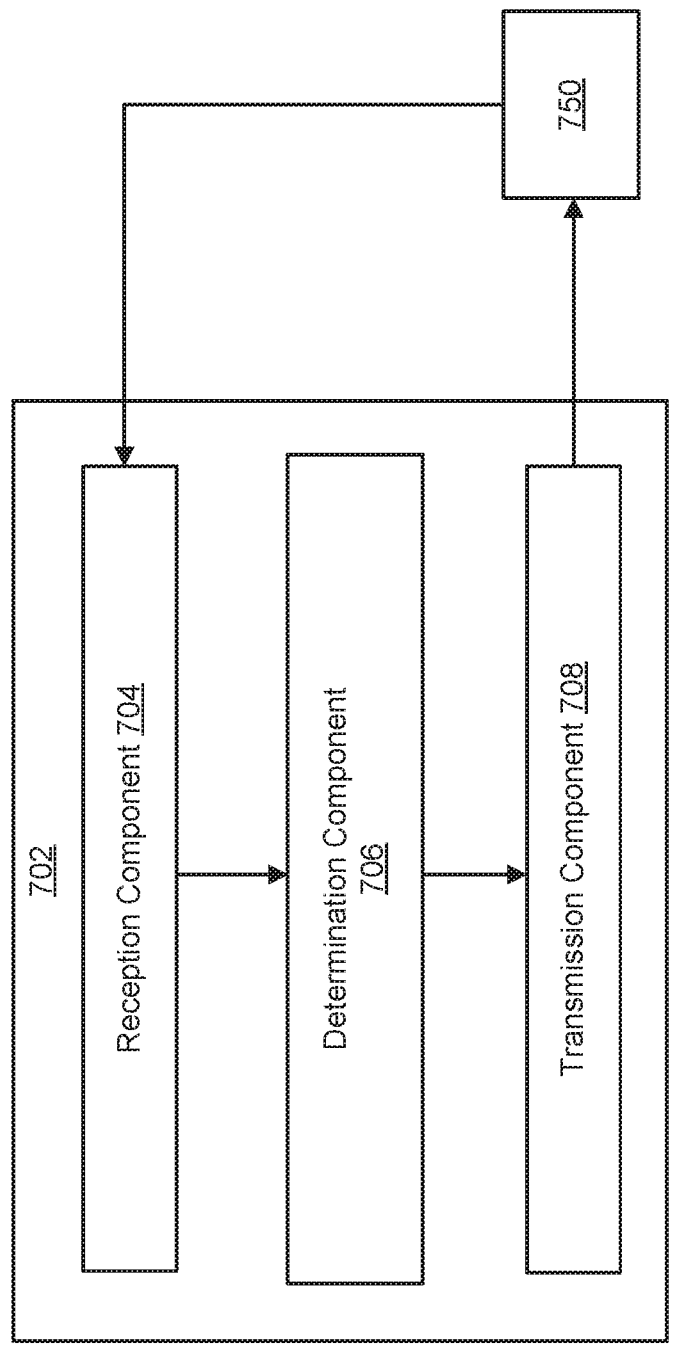
FIG. 7 is a conceptual data flow diagram illustrating a data flow between different components in an example apparatus, in accordance with various aspects of the present disclosure.

FIG. 7 is a conceptual data flow diagram 700 illustrating a data flow between different components in an example apparatus 702. The apparatus 702 may be a UE (e.g., UE 120, UE 305-1, UE 305-2, UE 405, UE 410, UE 120i, UE 120r, and/or the like). In some aspects, the apparatus 702 includes a reception component 704, a determination component 706, and/or a transmission component 708. As shown in FIG. 7, the apparatus 702 may communicate with another apparatus 750 (e.g., another UE) using the reception component 704 and/or the transmission component 708.

Reception component 704 may receive one or more sidelink communications from apparatus 750. For example, reception component 704 may receive one or more sidelink transmissions from apparatus 750 via an unlicensed channel during a channel occupancy time acquired by apparatus 750. Furthermore, in some aspects, reception component 704 may receive, from apparatus 750, sidelink control information that includes information to enable the apparatus 702 to share the channel occupancy time acquired by apparatus 750. In some aspects, reception component 704 may include an antenna (e. g., antenna 252), a receive processor (e. g, receive processor 258), a controller/processor (e. g., controller/processor 280), a transceiver, a receiver, and/or the like.

Determination component 706 may determine, within the channel occupancy time shared with apparatus 750, one or more contention slot starting times based at least in part on an LBT duration and an AGC duration. In some aspects, determination component 706 may include a processor (e.g., a transmit processor 264, a receive processor 258, a controller/processor 280, and/or the like).

Transmission component 708 may transmit one or more sidelink communications to apparatus 750. For example, transmission component 708 may transmit, to apparatus 750, a sidelink communication at a starting time selected from one or more of the one or more contention slot starting times determined by the determination component 706. In some aspects, transmission component 708 may include an antenna (e. g, antenna 252), a transmit processor (e. g, transmit processor 264), a controller/processor (e.g., controller/processor 280), a transceiver, a transmitter, and/or the like.

The apparatus may include additional components that perform each of the blocks in the aforementioned process 700 of FIG. 7 and/or the like. Each block in the aforementioned process 700 of FIG. 7 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of components (e.g., one or more components) shown in FIG. 7 may perform one or more functions described as being performed by another set of components shown in FIG. 7.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first user equipment (UE), comprising:
   determining, within a channel occupancy time shared with a second UE, a set of candidate contention slot starting times based at least in part on a listen before talk (LBT) duration and an automatic gain control (AGC) duration, a count of candidate contention slot starting times in the set of candidate contention slot starting times being based at least in part on a subcarrier spacing; and
   transmitting a sidelink communication to the second UE at a starting time selected from the set of candidate contention slot starting times.

2. The method of claim 1, wherein the set of candidate contention slot starting times occur in one or more of a last symbol in a current slot or a first symbol in a next slot.

3. The method of claim 1, wherein the LBT duration starts from a beginning of a last symbol in a current slot and the AGC duration includes at least a portion of a first symbol in a next slot.

4. The method of claim 3, wherein the set of candidate contention slot starting times occur in a window between an ending time of the LBT duration and a starting time of the AGC duration.

5. The method of claim 3, wherein the portion of the first symbol in the next slot that corresponds to the AGC duration is based at least in part on the subcarrier spacing.

6. The method of claim 1, wherein the count of candidate contention slot starting times in the set of candidate contention slot starting times is further based at least in part on a contention slot duration.

7. The method of claim 1, wherein the LBT duration has a length that depends on a location of a first symbol in which the sidelink communication is transmitted.

8. The method of claim 1, wherein the set of candidate contention slot starting times are identified relative to an ending time of the LBT duration or relative to a starting time of the AGC duration.

9. The method of claim 1, wherein the starting time for transmitting the sidelink communication is randomly selected from the set of candidate contention slot starting times.

10. A first user equipment (UE) for wireless communication, comprising:
one or more memories; and
one or more processors coupled to the one or more memories, the one or more processors configured to:
determine, within a channel occupancy time shared with a second UE, a set of candidate contention slot starting times based at least in part on a listen before talk (LBT) duration and an automatic gain control (AGC) duration, a count of candidate contention slot starting times in the set of candidate contention slot starting times being based at least in part on a subcarrier spacing; and
transmit a sidelink communication to the second UE at a starting time selected from the set of candidate contention slot starting times.

11. The first UE of claim 10, wherein the set of candidate contention slot starting times occur in one or more of a last symbol in a current slot or a first symbol in a next slot.

12. The first UE of claim 10, wherein the LBT duration starts from a beginning of a last symbol in a current slot and the AGC duration includes at least a portion of a first symbol in a next slot.

13. The first UE of claim 12, wherein the set of candidate contention slot starting times occur in a window between an ending time of the LBT duration and a starting time of the AGC duration.

14. The first UE of claim 12, wherein the portion of the first symbol in the next slot that corresponds to the AGC duration is based at least in part on the subcarrier spacing.

15. The first UE of claim 10, wherein the count of candidate contention slot starting times in the set of candidate contention slot starting times is further based at least in part on a contention slot duration.

16. The first UE of claim 10, wherein the LBT duration has a length that depends on a location of a first symbol in which the sidelink communication is transmitted.

17. The first UE of claim 10, wherein the set of candidate contention slot starting times are identified relative to an ending time of the LBT duration or relative to a starting time of the AGC duration.

18. The first UE of claim 10, wherein the starting time for transmitting the sidelink communication is randomly selected from the set of candidate contention slot starting times.

19. A non-transitory computer-readable medium storing one or more instructions for wireless communication, the one or more instructions comprising:
one or more instructions that, when executed by one or more processors of a first user equipment (UE), cause the one or more processors to:
determine, within a channel occupancy time shared with a second UE, a set of candidate contention slot starting times based at least in part on a listen before talk (LBT) duration and an automatic gain control (AGC) duration, a count of candidate contention slot starting times in the set of candidate contention slot starting times being based at least in part on a subcarrier spacing; and
transmit a sidelink communication to the second UE at a starting time selected from the set of candidate contention slot starting times.

20. The non-transitory computer-readable medium of claim 19, wherein the set of candidate contention slot starting times occur in one or more of a last symbol in a current slot or a first symbol in a next slot.

21. The non-transitory computer-readable medium of claim 19, wherein the LBT duration starts from a beginning of a last symbol in a current slot and the AGC duration includes at least a portion of a first symbol in a next slot.

22. The non-transitory computer-readable medium of claim 21, wherein the set of candidate contention slot starting times occur in a window between an ending time of the LBT duration and a starting time of the AGC duration.

23. The non-transitory computer-readable medium of claim 21, wherein the portion of the first symbol in the next slot that corresponds to the AGC duration is based at least in part on the subcarrier spacing.

24. The non-transitory computer-readable medium of claim 19, wherein the count of candidate contention slot starting times in the set of candidate contention slot starting times is further based at least in part on a contention slot duration.

25. The non-transitory computer-readable medium of claim 19, wherein the LBT duration has a length that depends on a location of a first symbol in which the sidelink communication is transmitted.

26. The non-transitory computer-readable medium of claim 19, wherein the set of candidate contention slot starting times are identified relative to an ending time of the LBT duration or relative to a starting time of the AGC duration.

27. The non-transitory computer-readable medium of claim 19, wherein the starting time for transmitting the sidelink communication is randomly selected from the set of candidate contention slot starting times.

28. An apparatus for wireless communication, comprising:
means for determining, within a channel occupancy time shared with a user equipment (UE), a set of candidate contention slot starting times based at least in part on a listen before talk (LBT) duration and an automatic gain control (AGC) duration, a count of candidate contention slot starting times in the set of candidate contention slot starting times being based at least in part on a subcarrier spacing; and
means for transmitting a sidelink communication to the UE at a starting time selected from the set of candidate contention slot starting times.

29. The apparatus of claim 28, wherein the set of candidate contention slot starting times occur in one or more of a last symbol in a current slot, a first symbol in a next slot, or a window between an ending time of the LBT duration and a starting time of the AGC duration.

30. The apparatus of claim 28, wherein the LBT duration starts from a beginning of a last symbol in a current slot and the AGC duration includes at least a portion of a first symbol in a next slot.

31. The apparatus of claim 30, wherein the portion of the first symbol in the next slot that corresponds to the AGC duration is based at least in part on the subcarrier spacing.

32. The apparatus of claim 28, wherein the count of candidate contention slot starting times in the set of candidate contention slot starting times is further based at least in part on a contention slot duration.

33. The apparatus of claim 28, wherein the LBT duration has a length that depends on a location of a first symbol in which the sidelink communication is transmitted.

34. The apparatus of claim 28, wherein the set of candidate contention slot starting times are identified relative to an ending time of the LBT duration or relative to a starting time of the AGC duration.

35. The apparatus of claim 28, wherein the starting time for transmitting the sidelink communication is randomly selected from the set of candidate contention slot starting times.

\* \* \* \* \*